United States Patent
Kacludis et al.

(10) Patent No.: US 9,118,226 B2
(45) Date of Patent: Aug. 25, 2015

(54) HEAT ENGINE SYSTEM WITH A SUPERCRITICAL WORKING FLUID AND PROCESSES THEREOF

(71) Applicant: Echogen Power Systems, LLC, Akron, OH (US)

(72) Inventors: Alexander Steven Kacludis, Medina, OH (US); Stephen R. Hostler, Akron, OH (US); Steve B. Zakem, Hiram, OH (US)

(73) Assignee: Echogen Power Systems, LLC, Akron, OH (US)

( * ) Notice: Subject to any disclaimer, the term of this patent is extended or adjusted under 35 U.S.C. 154(b) by 45 days.

(21) Appl. No.: 14/051,432

(22) Filed: Oct. 10, 2013

(65) Prior Publication Data

US 2014/0103661 A1 Apr. 17, 2014

Related U.S. Application Data

(60) Provisional application No. 61/712,929, filed on Oct. 12, 2012.

(51) Int. Cl.
*F01K 25/08* (2006.01)
*F01K 13/02* (2006.01)
(Continued)

(52) U.S. Cl.
CPC ............... *H02K 7/1823* (2013.01); *F01D 1/00* (2013.01); *F01K 9/003* (2013.01); *F01K 11/00* (2013.01); *F01K 25/10* (2013.01); *F02C 1/04* (2013.01)

(58) Field of Classification Search
CPC ....... H02K 7/1823; F01K 25/10; F01K 11/00; F01K 9/003; F02C 1/04; F01D 1/00
USPC ............................................ 60/651, 671, 660
See application file for complete search history.

(56) References Cited

U.S. PATENT DOCUMENTS 2,575,478 A 11/1951 Wilson
2,634,375 A 4/1953 Guimbal
(Continued)

FOREIGN PATENT DOCUMENTS

CA 2794150 A1 11/2011
CN 1165238 A 11/1997
(Continued)

OTHER PUBLICATIONS

CN Search Report for Application No. 201080035382.1, 2 pages.
(Continued)

*Primary Examiner* — Hoang Nguyen
(74) *Attorney, Agent, or Firm* — Edmonds & Nolte, PC

(57) ABSTRACT

Aspects of the invention disclosed herein generally provide heat engine systems and methods for generating electricity. In one configuration, a heat engine system contains a working fluid circuit having high and low pressure sides and containing a working fluid (e.g., sc-$CO_2$). The system further contains a power turbine configured to convert thermal energy to mechanical energy, a motor-generator configured to convert the mechanical energy into electricity, and a pump configured to circulate the working fluid within the working fluid circuit. The system further contains a heat exchanger configured to transfer thermal energy from a heat source stream to the working fluid, a recuperator configured to transfer thermal energy from the low pressure side to the high pressure side of the working fluid circuit, and a condenser (e.g., air- or fluid-cooled) configured to remove thermal energy from the working fluid within the low pressure side of the working fluid circuit.

20 Claims, 5 Drawing Sheets

(51) Int. Cl.
   *H02K 7/18*    (2006.01)
   *F01D 1/00*    (2006.01)
   *F01K 9/00*    (2006.01)
   *F01K 11/00*   (2006.01)
   *F01K 25/10*   (2006.01)
   *F02C 1/04*    (2006.01)

(56) References Cited

U.S. PATENT DOCUMENTS

| | | |
|---|---|---|
| 2,691,280 A | 10/1954 | Albert |
| 3,095,274 A | 6/1963 | Crawford |
| 3,105,748 A | 10/1963 | Stahl |
| 3,237,403 A | 3/1966 | Feher |
| 3,277,955 A | 10/1966 | Laszlo |
| 3,401,277 A | 9/1968 | Larson |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,830,062 A | 8/1974 | Morgan et al. |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes et al. |
| 4,221,185 A | 9/1980 | Scholes |
| 4,233,085 A | 11/1980 | Roderick |
| 4,236,869 A | 12/1980 | Laurello |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,291,960 A | 3/1994 | Brandenburg |
| 5,320,482 A | 6/1994 | Palmer et al. |
| 5,335,510 A | 8/1994 | Rockenfeller |
| 5,358,378 A | 10/1994 | Holscher |
| 5,360,057 A | 11/1994 | Rockenfeller |
| 5,392,606 A | 2/1995 | Labinov |
| 5,440,882 A | 8/1995 | Kalina |
| 5,444,972 A | 8/1995 | Moore |
| 5,483,797 A | 1/1996 | Rigal et al. |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |

(56) References Cited

U.S. PATENT DOCUMENTS

| | | | |
|---|---|---|---|
| 6,164,655 A | 12/2000 | Bothien | |
| 6,202,782 B1 | 3/2001 | Hatanaka | |
| 6,223,846 B1 | 5/2001 | Schechter | |
| 6,233,938 B1 | 5/2001 | Nicodemus | |
| 6,282,900 B1 | 9/2001 | Bell | |
| 6,282,917 B1 | 9/2001 | Mongan | |
| 6,295,818 B1 | 10/2001 | Ansley | |
| 6,299,690 B1 | 10/2001 | Mongeon | |
| 6,341,781 B1 | 1/2002 | Matz | |
| 6,374,630 B1 | 4/2002 | Jones | |
| 6,393,851 B1 | 5/2002 | Wightman | |
| 6,432,320 B1 | 8/2002 | Bonsignore | |
| 6,434,955 B1 | 8/2002 | Ng | |
| 6,442,951 B1 | 9/2002 | Maeda | |
| 6,446,425 B1 | 9/2002 | Lawlor | |
| 6,446,465 B1 | 9/2002 | Dubar | |
| 6,463,730 B1 | 10/2002 | Keller | |
| 6,484,490 B1 | 11/2002 | Olsen | |
| 6,539,720 B2 | 4/2003 | Rouse et al. | |
| 6,539,728 B2 | 4/2003 | Korin | |
| 6,571,548 B1 | 6/2003 | Bronicki | |
| 6,581,384 B1 | 6/2003 | Benson | |
| 6,598,397 B2 | 7/2003 | Hanna | |
| 6,644,062 B1 | 11/2003 | Hays | |
| 6,657,849 B1 | 12/2003 | Andresakis | |
| 6,668,554 B1 | 12/2003 | Brown | |
| 6,684,625 B2 | 2/2004 | Kline | |
| 6,695,974 B2 | 2/2004 | Withers | |
| 6,715,294 B2 | 4/2004 | Anderson | |
| 6,734,585 B2 | 5/2004 | Tornquist | |
| 6,735,948 B1 | 5/2004 | Kalina | |
| 6,739,142 B2 | 5/2004 | Korin | |
| 6,751,959 B1 | 6/2004 | McClanahan et al. | |
| 6,769,256 B1 | 8/2004 | Kalina | |
| 6,799,892 B2 | 10/2004 | Leuthold | |
| 6,808,179 B1 | 10/2004 | Bhattacharyya | |
| 6,810,335 B2 | 10/2004 | Lysaght | |
| 6,817,185 B2 | 11/2004 | Coney | |
| 6,857,268 B2 | 2/2005 | Stinger | |
| 6,910,334 B2 | 6/2005 | Kalina | |
| 6,918,254 B2 | 7/2005 | Baker | |
| 6,921,518 B2 | 7/2005 | Johnston | |
| 6,941,757 B2 | 9/2005 | Kalina | |
| 6,960,839 B2 | 11/2005 | Zimron | |
| 6,960,840 B2 | 11/2005 | Willis | |
| 6,962,054 B1 | 11/2005 | Linney | |
| 6,964,168 B1 | 11/2005 | Pierson | |
| 6,968,690 B2 | 11/2005 | Kalina | |
| 6,986,251 B2 | 1/2006 | Radcliff | |
| 7,013,205 B1 | 3/2006 | Hafner et al. | |
| 7,021,060 B1 | 4/2006 | Kalina | |
| 7,022,294 B2 | 4/2006 | Johnston | |
| 7,033,533 B2 | 4/2006 | Lewis-Aburn et al. | |
| 7,036,315 B2 | 5/2006 | Kang | |
| 7,041,272 B2 | 5/2006 | Keefer | |
| 7,047,744 B1 | 5/2006 | Robertson | |
| 7,048,782 B1 | 5/2006 | Couch | |
| 7,062,913 B2 | 6/2006 | Christensen | |
| 7,096,665 B2 | 8/2006 | Stinger | |
| 7,096,679 B2 | 8/2006 | Manole | |
| 7,124,587 B1 | 10/2006 | Linney | |
| 7,174,715 B2 | 2/2007 | Armitage | |
| 7,194,863 B2 | 3/2007 | Ganev | |
| 7,197,876 B1 | 4/2007 | Kalina | |
| 7,200,996 B2 | 4/2007 | Cogswell | |
| 7,234,314 B1 | 6/2007 | Wiggs | |
| 7,249,588 B2 | 7/2007 | Russell | |
| 7,278,267 B2 | 10/2007 | Yamada | |
| 7,279,800 B2 | 10/2007 | Bassett | |
| 7,287,381 B1 | 10/2007 | Pierson | |
| 7,305,829 B2 | 12/2007 | Mirolli | |
| 7,313,926 B2 | 1/2008 | Gurin | |
| 7,340,894 B2 | 3/2008 | Miyahara et al. | |
| 7,340,897 B2 | 3/2008 | Zimron | |
| 7,406,830 B2 | 8/2008 | Valentian | |
| 7,416,137 B2 | 8/2008 | Hagen et al. | |
| 7,453,242 B2 | 11/2008 | Ichinose | |
| 7,458,217 B2 | 12/2008 | Kalina | |
| 7,458,218 B2 | 12/2008 | Kalina | |
| 7,464,551 B2 | 12/2008 | Althaus et al. | |
| 7,469,542 B2 | 12/2008 | Kalina | |
| 7,516,619 B2 | 4/2009 | Pelletier | |
| 7,600,394 B2 | 10/2009 | Kalina | |
| 7,621,133 B2 | 11/2009 | Tomlinson | |
| 7,654,354 B1 | 2/2010 | Otterstrom | |
| 7,665,291 B2 | 2/2010 | Anand | |
| 7,665,304 B2 | 2/2010 | Sundel | |
| 7,685,821 B2 | 3/2010 | Kalina | |
| 7,730,713 B2 | 6/2010 | Nakano | |
| 7,735,335 B2 | 6/2010 | Uno | |
| 7,770,376 B1 | 8/2010 | Brostmeyer | |
| 7,775,758 B2 | 8/2010 | Legare | |
| 7,827,791 B2 | 11/2010 | Pierson | |
| 7,838,470 B2 | 11/2010 | Shaw | |
| 7,841,179 B2 | 11/2010 | Kalina | |
| 7,841,306 B2 | 11/2010 | Myers | |
| 7,854,587 B2 | 12/2010 | Ito | |
| 7,866,157 B2 | 1/2011 | Ernst | |
| 7,900,450 B2 | 3/2011 | Gurin | |
| 7,950,230 B2 | 5/2011 | Nishikawa | |
| 7,950,243 B2 | 5/2011 | Gurin | |
| 7,972,529 B2 | 7/2011 | Machado | |
| 7,997,076 B2 | 8/2011 | Ernst | |
| 8,096,128 B2 | 1/2012 | Held et al. | |
| 8,099,198 B2 | 1/2012 | Gurin | |
| 8,146,360 B2 | 4/2012 | Myers | |
| 8,281,593 B2 | 10/2012 | Held | |
| 8,419,936 B2 | 4/2013 | Berger et al. | |
| 2001/0015061 A1 | 8/2001 | Viteri et al. | |
| 2001/0020444 A1 | 9/2001 | Johnston | |
| 2001/0030952 A1 | 10/2001 | Roy | |
| 2002/0029558 A1 | 3/2002 | Tamaro | |
| 2002/0066270 A1 | 6/2002 | Rouse et al. | |
| 2002/0078696 A1 | 6/2002 | Korin | |
| 2002/0078697 A1 | 6/2002 | Lifson | |
| 2002/0082747 A1 | 6/2002 | Kramer | |
| 2003/0000213 A1 | 1/2003 | Christensen | |
| 2003/0061823 A1 | 4/2003 | Alden | |
| 2003/0154718 A1 | 8/2003 | Nayar | |
| 2003/0182946 A1 | 10/2003 | Sami | |
| 2003/0213246 A1 | 11/2003 | Coll et al. | |
| 2003/0221438 A1 | 12/2003 | Rane et al. | |
| 2004/0011038 A1 | 1/2004 | Stinger | |
| 2004/0011039 A1 | 1/2004 | Stinger et al. | |
| 2004/0020185 A1 | 2/2004 | Brouillette et al. | |
| 2004/0020206 A1 | 2/2004 | Sullivan et al. | |
| 2004/0021182 A1 | 2/2004 | Green et al. | |
| 2004/0035117 A1 | 2/2004 | Rosen | |
| 2004/0083731 A1 | 5/2004 | Lasker | |
| 2004/0083732 A1 | 5/2004 | Hanna et al. | |
| 2004/0088992 A1 | 5/2004 | Brasz et al. | |
| 2004/0097388 A1 | 5/2004 | Brask et al. | |
| 2004/0105980 A1 | 6/2004 | Sudarshan et al. | |
| 2004/0107700 A1 | 6/2004 | McClanahan et al. | |
| 2004/0159110 A1 | 8/2004 | Janssen | |
| 2004/0211182 A1 | 10/2004 | Gould | |
| 2005/0022963 A1 | 2/2005 | Garrabrant et al. | |
| 2005/0056001 A1 | 3/2005 | Frutschi | |
| 2005/0096676 A1 | 5/2005 | Gifford, III et al. | |
| 2005/0109387 A1 | 5/2005 | Marshall | |
| 2005/0137777 A1 | 6/2005 | Kolavennu et al. | |
| 2005/0162018 A1 | 7/2005 | Realmuto et al. | |
| 2005/0167169 A1 | 8/2005 | Gering et al. | |
| 2005/0183421 A1 | 8/2005 | Vaynberg et al. | |
| 2005/0196676 A1 | 9/2005 | Singh et al. | |
| 2005/0198959 A1 | 9/2005 | Schubert | |
| 2005/0227187 A1 | 10/2005 | Schilling | |
| 2005/0247059 A1* | 11/2005 | Cogswell et al. ............... 60/645 |
| 2005/0252235 A1 | 11/2005 | Critoph et al. | |
| 2005/0257812 A1 | 11/2005 | Wright et al. | |
| 2006/0010868 A1 | 1/2006 | Smith | |
| 2006/0060333 A1 | 3/2006 | Chordia et al. | |
| 2006/0066113 A1 | 3/2006 | Ebrahim et al. | |
| 2006/0080960 A1 | 4/2006 | Rajendran et al. | |

(56) References Cited

U.S. PATENT DOCUMENTS

| | | |
|---|---|---|
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0240420 A1* | 10/2007 | Bronicki .................. 60/671 |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Peterson et al. |
| 2009/0211253 A1 | 8/2009 | Radcliff et al. |
| 2009/0266075 A1 | 10/2009 | Westmeier et al. |
| 2009/0277400 A1* | 11/2009 | Conry .................. 123/2 |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopacek et al. |
| 2011/0259010 A1 | 10/2011 | Bronicki et al. |
| 2011/0299972 A1 | 12/2011 | Morris |
| 2011/0308253 A1 | 12/2011 | Ritter |
| 2012/0023946 A1* | 2/2012 | Ernst et al. .................. 60/660 |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 19906087 A1 | 8/2000 |
| DE | 10052993 A1 | 5/2002 |
| EP | 0 277 777 B1 | 6/1992 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 | 1/2013 |
| GB | 856985 A | 12/1960 |
| GB | 2010974 A | 7/1979 |
| GB | 2075608 A | 11/1981 |
| JP | 58-193051 A | 11/1983 |
| JP | 60040707 A | 3/1985 |
| JP | 61-152914 A | 7/1986 |
| JP | 01-240705 A | 9/1989 |
| JP | H 03-215139 A | 9/1991 |
| JP | 05-321612 A | 12/1993 |
| JP | 06-331225 A | 11/1994 |
| JP | 08028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11270352 | 5/1999 |
| JP | 2000257407 A | 9/2000 |
| JP | 2001-193419 A | 7/2001 |
| JP | 2002-097965 A | 4/2002 |
| JP | 2003529715 A | 10/2003 |
| JP | 2004-239250 A | 8/2004 |
| JP | 2004-332626 A | 11/2004 |
| JP | 2005030727 A | 2/2005 |
| JP | 2005-533972 A1 | 11/2005 |
| JP | 2006037760 A | 2/2006 |
| JP | 2006177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10 2007 0086244 A | 8/2007 |
| KR | 10-0766101 B1 | 10/2007 |
| KR | 10-0844634 A | 7/2008 |
| KR | 10-20100067927 A | 6/2010 |

(56) References Cited

FOREIGN PATENT DOCUMENTS

| | | |
|---|---|---|
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 91/05145 A1 | 4/1991 |
| WO | WO 96/09500 A1 | 3/1996 |
| WO | 0071944 A1 | 11/2000 |
| WO | WO 01/44658 A1 | 6/2001 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008/039725 A2 | 4/2008 |
| WO | 2008101711 A2 | 8/2008 |
| WO | WO 2009/045196 A1 | 4/2009 |
| WO | WO 2009/058992 A2 | 5/2009 |
| WO | 2010083198 A1 | 7/2010 |
| WO | WO 2010/074173 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |

OTHER PUBLICATIONS

CN Search Report for Application No. 201080050795.7, 2 pages.
PCT/US2011/062198—Extended European Search Report dated May 6, 2014, 9 pages.
PCT/US2011/055547—Extended European Search Report dated May 28, 2014, 8 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration dated May 9, 2014, 12 pages.
PCT/US2014/023026—Notification of Transmittal of the International Search Report and the Written Opinion of the International Searching Authority, or the Declaration dated Jul. 22, 2014, 11 pages.
PCT/US2014/023990—Notification of Transmittal of the International Search Report and the Written Opinion of the International Searching Authority, or the Declaration dated Jul. 17, 2014, 10 pages.
PCT/US2014/026173—Notification of Transmittal of the International Search Report and the Written Opinion of the International Searching Authority, or the Declaration dated Jul. 9, 2014, 10 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.
Angelino, G., and Invernizzi, C.M., "Carbon Dioxide Power Cycles using Liquid Natural Gas as Heat Sink", Applied Thermal Engineering Mar. 3, 2009, 43 pages.
Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.
Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.
Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.
Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.
Chen, Yang, "Thermodynamic Cycles Using Carbon Dioxide as Working Fluid", Doctoral Thesis, School of Industrial Engineering and Management, Stockholm, Oct. 2011, 150 pages., (3 parts).
Chordia, Lalit, "Optimizing Equipment for Supercritical Applications", Thar Energy LLC, Supercritical CO2 Power Cycle Symposium, May 24-25, 2011, Boulder, CO, 7 pages.
Combs, Osie V., "An Investigation of the Supercritical CO2 Cycle (Feher cycle) for Shipboard Application", Massachusetts Institute of Technology, May 1977, 290 pages.
Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.
Dostal, V., et al., A Supercritical Carbon Dioxide Cycle for Next Generation Nuclear Reactors, Mar. 10, 2004, 326 pages., (7 parts).
Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.
Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.
Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.
Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.
Feher, E.G., et al., "Investigation of Supercritical (Feher) Cycle", Astropower Laboratory, Missile & Space Systems Division, Oct. 1968, 152 pages.
Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.

(56) References Cited

OTHER PUBLICATIONS

Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.

Hejzlar, P. et al., "Assessment of Gas Cooled Gas Reactor with Indirect Supercritical CO2 Cycle" Massachusetts Institute of Technology, Jan. 2006, 10 pages.

Hoffman, John R., and Feher, E.G, "150 kwe Supercritical Closed Cycle System", Transactions of the ASME, Jan. 1971, pp. 70-80.

Jeong, Woo Seok, et al., "Performance of S—CO2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

Kulhanek, Martin, "Thermodynamic Analysis and Comparison of S—CO2 Cycles", Presentation, Czech Technical University in Prague, Supercritical CO2 Power Cycle Symposium, May 24-25, 2011, Boulder, CO, 14 pages.

Kulhanek, Martin, "Thermodynamic Analysis and Comparison of S—CO2 Cycles", Paper, Czech Technical University in Prague, Supercritical CO2 Power Cycle Symposium, May 24-25, 2011, Boulder, CO, 7 pages.

Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.

Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.

Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.

Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.

Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.

Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.

Muto, Yasushi, and Kato, Yasuyoshi, "Optimal Cycle Scheme of Direct Cycle Supercritical CO2 Gas Turbine for Nuclear Power Generation Systems", International Conference on Power Engineering—2007, Oct. 23-27, 2007, Hangzhou, China, pp. 86-87.

Noriega, Bahamonde J.S., "Design Method for s—CO2 Gas Turbine Power Plants", Master of Science Thesis, Delft University of Technology, Oct. 2012, 122 pages., (3 parts).

Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.

Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.

Parma, Ed, et al., "Supercritical CO2 Direct Cycle Gas Fast Reactor (SC—GFR) Concept" Presentation for Supercritical CO2 Power Cycle Symposium, May 24-25, 2011, Boulder, CO, 40 pages.

Parma, Ed, et al., "Supercritical CO2 Direct Cycle Gas Fast Reactor (SC—GFR) Concept", Supercritical CO2 Power Cycle Symposium, May 24-25, 2011, Boulder, CO, 9 pages.

Parma, Edward J., et al., "Supercritical CO2 Direct Cycle Gas Fast Reactor (SC—GFR) Concept", Presentation, Sandia National Laboratories, May 2011, 55 pages.

PCT/US2006/049623—Written Opinion of ISA dated Jan. 4, 2008, 4 pages.

PCT/US2007/001120—International Search Report dated Apr. 25, 2008, 7 pages.

PCT/US2007/079318—International Preliminary Report on Patentability dated Jul. 7, 2008, 5 pages.

PCT/US2010/031614—International Search Report dated Jul. 12, 2010, 3 pages.

PCT/US2010/031614—International Preliminary Report on Patentability dated Oct. 27, 2011, 9 pages.

PCT/US2010/039559—International Preliminary Report on Patentability dated Jan. 12, 2012, 7 pages.

PCT/US2010/039559—Notification of Transmittal of the International Search Report and Written Opinion of the International Searching Authority, or the Declaration dated Sep. 1, 2010, 6 pages.

PCT/US2010/044476—International Search Report dated Sep. 29, 2010, 23 pages.

PCT/US2010/044681—International Search Report and Written Opinion mailed Oct. 7, 2010, 10 pages.

PCT/US2010/044681—International Preliminary Report on Patentability dated Feb. 16, 2012, 9 pages.

PCT/US2010/049042—International Search Report and Written Opinion dated Nov. 17, 2010, 11 pages.

PCT/US2010/049042—International Preliminary Report on Patentability dated Mar. 29, 2012, 18 pages.

PCT/US2011/029486—International Preliminary Report on Patentability dated Sep. 25, 2012, 6 pages.

PCT/US2011/029486—International Search Report and Written Opinion dated Nov. 16, 2011, 9 pages.

PCT/US2011/062266—International Search Report and Written Opinion dated Jul. 9, 2012, 12 pages.

PCT/US2011/062198—International Search Report and Written Opinion dated Jul. 2, 2012, 9 pages.

PCT/US2011/062201—International Search Report and Written Opinion dated Jun. 26, 2012, 9 pages.

PCT/US2011/062204—International Search Report dated Nov. 1, 2012, 10 pages.

PCT/US2011/62207—International Search Report and Written Opinion dated Jun. 28, 2012, 7 pages.

PCT/US2012/000470—International Search Report dated Mar. 8, 2013, 10 pages.

PCT/US2012/061151—International Search Report and Written Opinion dated Feb. 25, 2013, 9 pages.

PCT/US2012/061159—International Search Report dated Mar. 2, 2013, 10 pages.

Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.

Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.

(56) References Cited

OTHER PUBLICATIONS

San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.

Sarkar, J., and Bhattacharyya, Souvik, "Optimization of Recompression S—CO2 Power Cycle with Reheating" Energy Conversion and Management 50 (May 17, 2009), pp. 1939-1945.

Tom, Samsun Kwok Sun, "The Feasibility of Using Supercritical Carbon Dioxide as a Coolant for the Candu Reactor", The University of British Columbia, Jan. 1978, 156 pages.

VGB PowerTech Service GmbH, "CO2 Capture and Storage", A VGB Report on the State of the Art, Aug. 25, 2004, 112 pages.

Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.

Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.

Wright, Steven A., et al., "Modeling and Experimental Results for Condensing Supercritical CO2 Power Cycles", Sandia Report, Jan. 2011, 47 pages.

Wright, Steven A., et al., "Supercritical CO2 Power Cycle Development Summary at Sandia National Laboratories", May 24-25, 2011, (1 page, Abstract only).

Wright, Steven, "Mighty Mite", Mechanical Engineering, Jan. 2012, pp. 41-43.

Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.

Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

\* cited by examiner

HEAT ENGINE SYSTEM WITH A SUPERCRITICAL WORKING FLUID AND PROCESSES THEREOF

CROSS-REFERENCE TO RELATED APPLICATIONS

This application claims benefit of U.S. Prov. Appl. No. 61/712,929, entitled "Heat Engine System with a Supercritical Working Fluid and Processes Thereof," and filed Oct. 12, 2012, which is incorporated herein by reference in its entirety to the extent consistent with the present application.

BACKGROUND

Waste heat is often created as a byproduct of industrial processes where flowing streams of high-temperature liquids, gases, or fluids must be exhausted into the environment or removed in some way in an effort to maintain the operating temperatures of the industrial process equipment. Some industrial processes utilize heat exchanger devices to capture and recycle waste heat back into the process via other process streams. However, the capturing and recycling of waste heat is generally infeasible by industrial processes that utilize high temperatures or have insufficient mass flow or other unfavorable conditions.

Waste heat can be converted into useful energy by a variety of turbine generator or heat engine systems that employ thermodynamic methods, such as Rankine cycles. Rankine cycles and similar thermodynamic methods are typically steam-based processes that recover and utilize waste heat to generate steam for driving a turbine, turbo, or other expander connected to an electric generator.

An organic Rankine cycle utilizes a lower boiling-point working fluid, instead of water, during a traditional Rankine cycle. Exemplary lower boiling-point working fluids include hydrocarbons, such as light hydrocarbons (e.g., propane or butane) and halogenated hydrocarbon, such as hydrochlorofluorocarbons (HCFCs) or hydrofluorocarbons (HFCs) (e.g., R245fa). More recently, in view of issues such as thermal instability, toxicity, flammability, and production cost of the lower boiling-point working fluids, some thermodynamic cycles have been modified to circulate non-hydrocarbon working fluids, such as ammonia.

Many heat engine systems are designed to work with a particular heat source and generally are very inefficient if used with any random heat source. The use of heat engine systems in existing facilities may also be constrained by limited available space or by limited access to waste heat sources.

Therefore, there is a need for a heat engine system and a method for recovering energy which have an optimized operating range for the heat recovery power cycle, minimized complexity, and maximized efficiency for producing mechanical energy and/or electrical energy from a wide range of thermal sources, such as a waste heat source.

SUMMARY

Embodiments of the invention generally provide heat engine systems and methods for recovering energy, such as by producing mechanical energy and/or generating electrical energy from thermal energy. In one embodiment disclosed herein, a heat engine system for generating electricity is provided and contains a working fluid circuit with a high pressure side and a low pressure side and containing a working fluid, such that at least a portion of the working fluid circuit contains the working fluid in a supercritical state. The heat engine system further contains the power turbine disposed between the high pressure side and the low pressure side of the working fluid circuit, fluidly coupled to and in thermal communication with the working fluid, and configured to convert thermal energy to mechanical energy by a pressure drop in the working fluid passing or otherwise flowing between the high pressure side and the low pressure side of the working fluid circuit. The heat engine system also contains a motor-generator coupled to or with the power turbine and configured to convert the mechanical energy into electrical energy and a pump coupled to or with the power turbine. The pump may be fluidly coupled to the low pressure side of the working fluid circuit by a pump inlet configured to receive the working fluid from the low pressure side of the working fluid circuit, fluidly coupled to the high pressure side of the working fluid circuit by a pump outlet configured to release the working fluid into the high pressure side of the working fluid circuit, and configured to circulate and pressurize the working fluid within the working fluid circuit.

The heat engine system further contains a heat exchanger fluidly coupled to and in thermal communication with the high pressure side of the working fluid circuit, configured to be fluidly coupled to and in thermal communication with a heat source stream, and configured to transfer thermal energy from the heat source stream to the working fluid. The heat engine system also contains a recuperator fluidly coupled to a condenser (e.g., air-cooled or fluid cooled) in series on the low pressure side of the working fluid circuit. The recuperator may be fluidly coupled to the working fluid circuit downstream of the pump and upstream of the heat exchanger on the high pressure side of the working fluid circuit, fluidly coupled to the working fluid circuit downstream of the power turbine and upstream of the condenser on the low pressure side of the working fluid circuit, and configured to transfer thermal energy from the working fluid within the low pressure side to the working fluid within the high pressure side of the working fluid circuit. The condenser may be fluidly coupled to the working fluid circuit downstream of the recuperator and upstream of the pump on the low pressure side of the working fluid circuit and configured to remove thermal energy from the working fluid within the low pressure side of the working fluid circuit.

In one embodiment, the condenser is an air-cooled condenser and the air-cooled condenser generally contains cooling fins or a heat sink and the cooling fins or the heat sink may be positioned and/or configured to receive a gaseous flow from one or more fans. In another embodiment, the condenser is a fluid-cooled condenser coupled to a cooling medium circuit. The cooling medium circuit generally contains circulating chilled water. In many examples, the working fluid contains carbon dioxide (e.g., sc-$CO_2$).

The motor-generator may be coupled to or with the power turbine by a shaft and the pump may also be coupled to or with the power turbine by the same shaft or a different shaft. In some configurations, the motor-generator may be disposed between the power turbine and the pump and the motor-generator may be coupled to or with the power turbine and the pump by independent shafts or by one common shaft.

In some embodiments, the heat engine system further contains a power outlet or a power electronics system electrically coupled to the motor-generator and configured to transfer the electrical energy from the motor-generator to an electrical grid. In other embodiments, the heat engine system further contains a process control system operatively connected to the heat engine system. The process control system may be configured to monitor and adjust temperatures and pressures throughout the working fluid circuit. In other embodiments, the heat engine system further contains a mass management system (MMS) fluidly coupled to the working fluid circuit. The mass management system has a mass control tank configured to receive, store, and distribute the working fluid. In one example, the mass control tank may be fluidly coupled to the high pressure side of the working fluid circuit and configured to receive the working fluid from the high pressure side and may be fluidly coupled to the low pressure side of the working fluid circuit and configured to distribute the working fluid to the low pressure side. In other embodiments, the heat engine system further contains a housing at least partially encompassing the pump and the power turbine. In other embodiments, the heat engine system further contains a leak recapture system configured to transfer captured gas or fluid from the housing, through a compressor, and into the working fluid circuit at a point upstream of the recuperator and downstream of the outlet of the power turbine.

In another embodiment disclosed herein, a heat engine system for generating electricity is provided and contains a single-core condensing heat exchanger having a working fluid inlet and a working fluid outlet providing a working fluid flow channel, a recuperator inlet and a recuperator outlet providing a recuperator flow channel through the single-core condensing heat exchanger and in thermal communication with the working fluid flow channel. The single-core condensing heat exchanger further contains a condenser inlet and a condenser outlet providing a condenser flow channel through the single-core condensing heat exchanger and in thermal communication with the working fluid flow channel. The heat engine system further contains a pump having an inlet in fluid communication with the working fluid outlet and an outlet in fluid communication with the recuperator inlet, the power turbine having an inlet in fluid communication with the recuperator outlet and an outlet in fluid communication the working fluid inlet, and a motor-generator rotatably coupled to the pump and the power turbine.

In another embodiment disclosed herein, a heat engine system for generating electricity is provided and contains a pump rotatably coupled to a motor-generator, the power turbine rotatably coupled to the motor-generator, and a single-core condensing heat exchanger having a working fluid inlet in fluid communication with an outlet of the power turbine and a working fluid outlet in fluid communication with an inlet of the pump. The heat engine system further contains a recuperator inlet disposed on the single-core condensing heat exchanger and in fluid communication with an outlet of the pump, a recuperator outlet disposed on the single-core condensing heat exchanger and in fluid communication with an inlet of the power turbine, and a condenser inlet and a condenser outlet disposed on the single-core condensing heat exchanger.

In some embodiments, a portion of the single-core condensing heat exchanger within the heat engine system may be a recuperator that contains the recuperator inlet, the recuperator outlet, and the recuperator flow channel. Similarly, in other embodiments, a portion of the single-core condensing heat exchanger within the heat engine system may be a condenser that contains the condenser inlet, the condenser outlet, and the condenser flow channel. The heat engine system may also contain a condenser loop in fluid communication with the condenser inlet and the condenser outlet.

In various configurations, the heat engine system further contains at least one heat exchanger, but may contain multiple heat exchangers, such as waste heat exchanger, disposed in fluid communication with the recuperator outlet and the power turbine inlet. Also, the heat engine system contains a bypass valve providing selective fluid communication between the power turbine inlet and the power turbine outlet. The heat engine system further contains a shaft coupled to turbomachinery components, such that the pump, the power turbine, and the motor-generator are rotatably coupled by the shaft. In some examples, the single-core condensing heat exchanger contains a plurality of parallel plates. In some examples, the pump, the motor-generator, the power turbine, and the single-core condensing heat exchanger are disposed within a support structure or housing of the heat engine system.

In another embodiment disclosed herein, a method for generating electricity is provided and includes operating a motor-generator to drive a pump that circulates or otherwise transfers the working fluid from a low pressure side of a working fluid circuit to a high pressure side of the working fluid circuit, adding heat to the working fluid in the high pressure side of the working fluid circuit by passing the working fluid in thermal communication with the working fluid in the low pressure side of the working fluid circuit in a single-core condensing heat exchanger, and adding heat to the working fluid in the high pressure side of the working fluid circuit by passing the working fluid in thermal communication with a waste heat source. The method further includes introducing the working fluid into the power turbine that converts high pressure working fluid into low pressure working fluid and generates rotational energy, such that the power turbine is rotationally coupled to the motor-generator. The method also includes exhausting the working fluid from the power turbine into the single-core condensing heat exchanger where the working fluid is first cooled by passing in thermal communication with the high pressure side of the working fluid circuit and then further cooled by passing in thermal communication with a condenser loop. The method further includes operating a bypass valve to selectively control the flow of the working fluid to the power turbine.

BRIEF DESCRIPTION OF THE DRAWINGS

Embodiments of the present disclosure may be understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
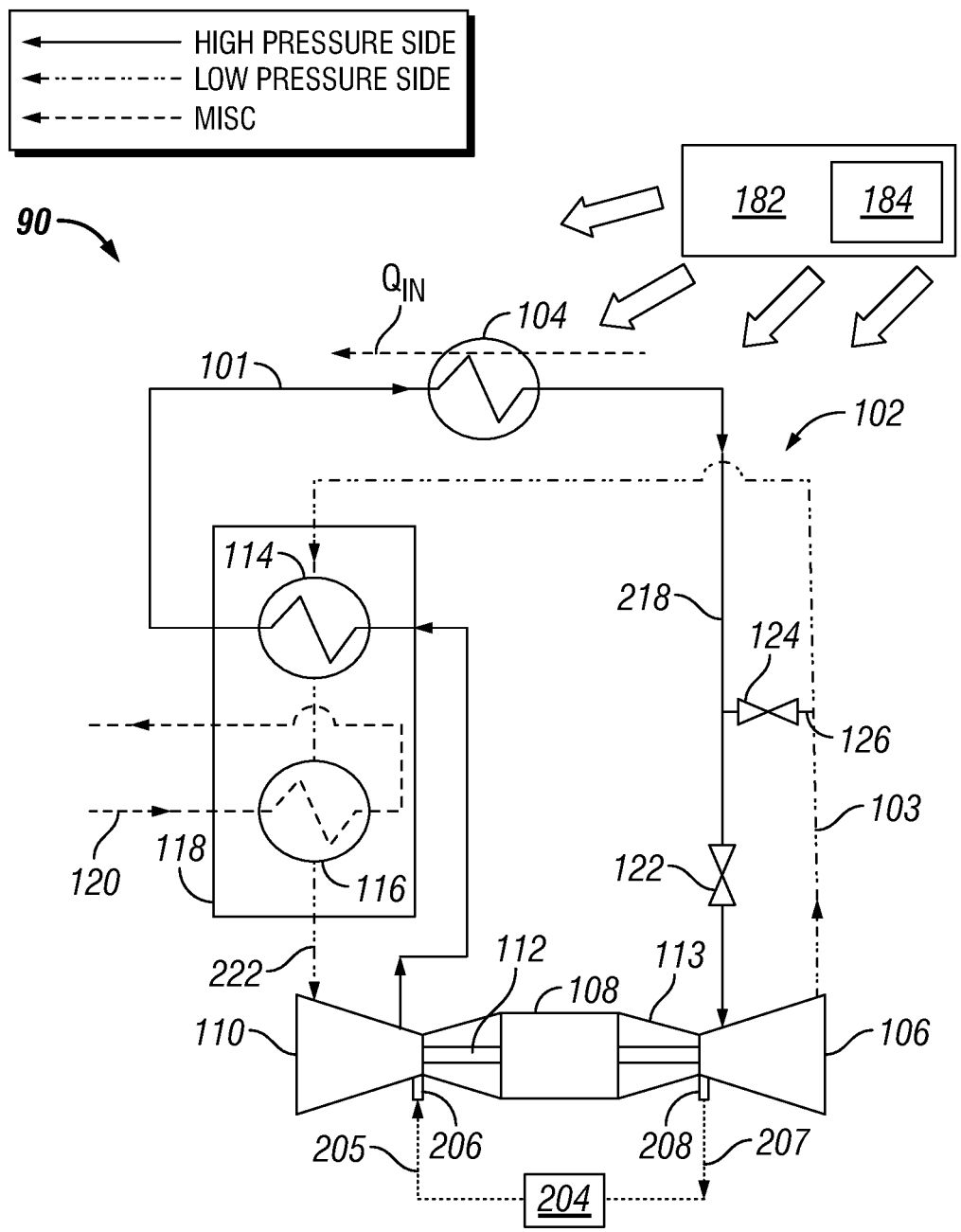
FIG. 1 illustrates an exemplary heat engine system, according to one or more embodiments disclosed herein.
Figure 2:
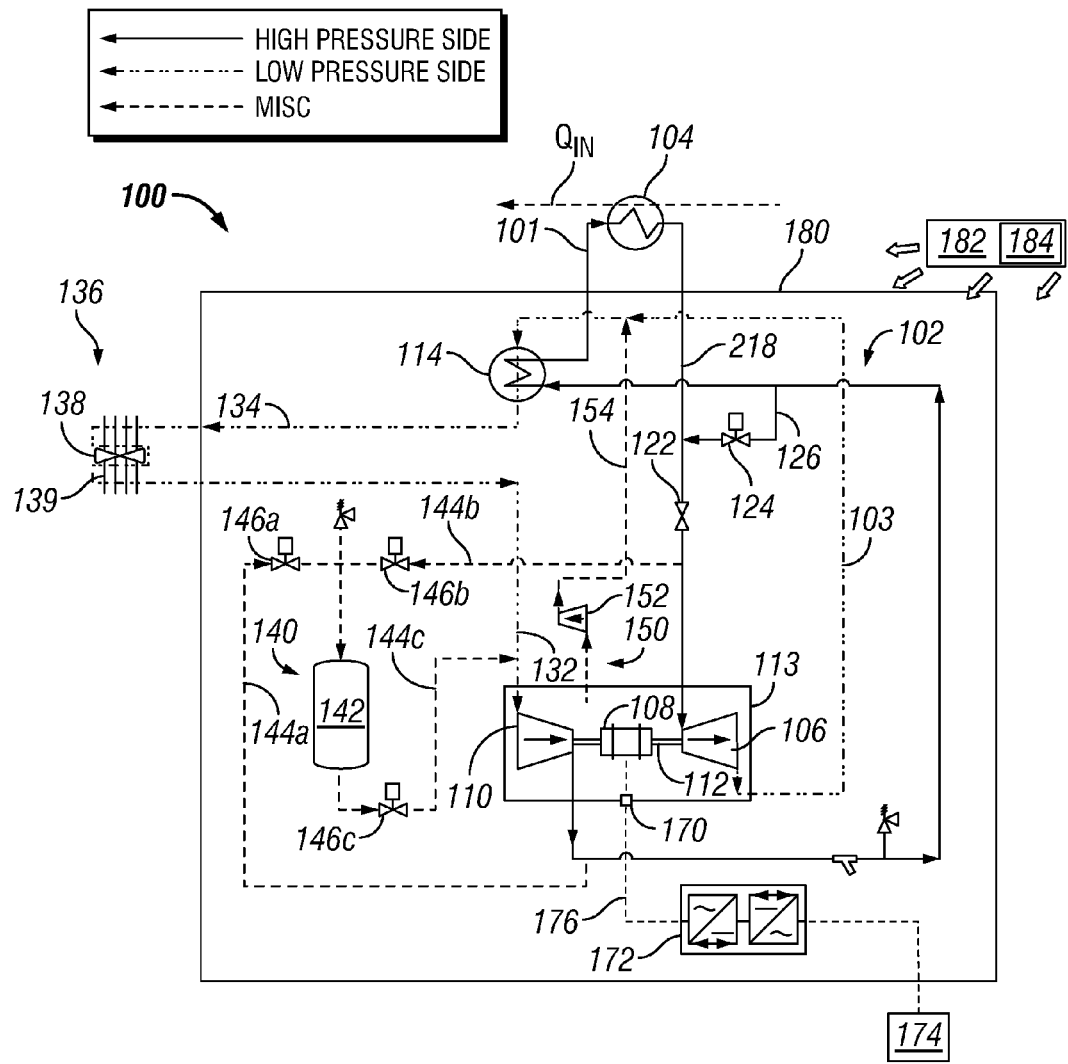
FIG. 2 illustrates another exemplary heat engine system, according to one or more embodiments disclosed herein.

Embodiments of the invention generally provide heat engine systems and methods for generating electricity. FIGS. 1 and 2 depict simplified schematics of heat engine systems 90 and 100, respectively, which may also be referred to as a thermal engine, a power generation device, a heat or waste heat recovery system, and/or a heat to electricity system. In one embodiment, the heat engine system 90 has a single-core condensing heat exchanger 118 containing a recuperator 114 and a fluid-cooled condenser 116 for condensing the working fluid within a working fluid circuit 102, as depicted in FIG. 1. In another embodiment, the heat engine system 100 contains the recuperator 114 and an air-cooled condenser 136 for condensing the working fluid within the working fluid circuit 102, as depicted in FIG. 2. The heat engine systems 90 and 100 may encompass one or more elements of a Rankine thermodynamic cycle configured to produce power from a wide range of thermal sources. The terms "thermal engine" or "heat engine" as used herein generally refer to the equipment set that executes the various thermodynamic cycle embodiments described herein. The term "heat recovery system" generally refers to the thermal engine in cooperation with other equipment to deliver/remove heat to and from the thermal engine.

The heat engine systems 90 and 100 may operate in a closed-loop thermodynamic cycle that circulates a working fluid throughout the working fluid circuit 102. The working fluid circuit 102 contains a variety of conduits and valves adapted to interconnect the various components of the heat engine systems 90 and 100. Although the heat engine systems 90 and 100 may be characterized as closed-loop cycle systems, each of the heat engine systems 90 and 100, as a whole, may or may not be hermetically-sealed so to prohibit the working fluid from leaking into the surrounding environment.

In one or more embodiments, the working fluid utilized in the heat engine systems 90 and 100 may contain carbon dioxide or a mixture containing carbon dioxide and at least a portion of the working fluid circuit 102 contains the working fluid in a supercritical state (e.g., sc-$CO_2$). In an exemplary embodiment, the working fluid circuit 102 contains a working fluid that is completely carbon dioxide or substantially carbon dioxide and the working fluid is utilized in a supercritical state. It should be noted that use of the terms carbon dioxide ($CO_2$), supercritical carbon dioxide (sc-$CO_2$), or subcritical carbon dioxide (sub-$CO_2$) is not intended to be limited to carbon dioxide of any particular type, source, purity, or grade. For example, industrial grade carbon dioxide may be contained in and/or used as the working fluid without departing from the scope of the disclosure.

In other embodiments, the working fluid may be a binary, ternary, or other working fluid blend. For example, a working fluid combination can be selected for the unique attributes possessed by the combination within a heat recovery system, such as the heat engine systems 90 and 100. One such fluid combination includes a liquid absorbent and carbon dioxide mixture enabling the combination to be pumped in a liquid state to high pressure with less energy input than required to compress gaseous carbon dioxide. In other examples, the working fluid may be a combination or mixture of carbon dioxide and one or more other miscible fluids. In yet other examples, the working fluid may be a combination of carbon dioxide and propane, or carbon dioxide and ammonia, or other similar gases, without departing from the scope of the disclosure.

FIGS. 1 and 2 depict the high and low pressure sides of the working fluid circuit 102 of the heat engine systems 90 and 100 by representing the high pressure side with "------" and the low pressure side with "—•—•—•"—as described in one or more embodiments. The use of the term "working fluid" is not intended to limit the state or phase of matter of the working fluid or components of the working fluid. For instance, the working fluid or portions of the working fluid may be in a fluid phase, a gas phase, a supercritical state, a subcritical state, or any other phase or state at any one or more points within the heat engine systems 90 and 100 or thermodynamic cycle. In one or more embodiments, the working fluid is in a supercritical state over certain portions of the working fluid circuit 102 of the heat engine systems 90 and 100 (e.g., a high pressure side) and in a subcritical state over other portions of the working fluid circuit 102 of the heat engine systems 90 and 100 (e.g., a low pressure side). In other embodiments, the entire thermodynamic cycle may be operated such that the working fluid is maintained in either a supercritical or subcritical state throughout the working fluid circuit 102.

The heat engine systems 90 and 100 generally contain a heat exchanger 104, such as a waste heat exchanger, in thermal communication with a heat source $Q_{in}$. One heat exchanger or multiple heat exchangers may be utilized as the heat exchanger 104. The temperature of the working fluid is increased as the working fluid flows through the heat exchanger 104 and thermal energy is transferred from the heat source $Q_{in}$ to the working fluid within the working fluid circuit 102. The heat source $Q_{in}$ may derive thermal energy from a variety of high temperature sources. For example, the heat source $Q_{in}$ may be a waste heat stream such as, but not limited to, gas turbine exhaust, process stream exhaust, or other combustion product exhaust streams, such as furnace or boiler exhaust streams. Accordingly, the heat engine systems 90 and 100 may be configured to transform waste heat into electricity for applications ranging from bottom cycling in gas turbines, stationary diesel engine gensets, industrial waste heat recovery (e.g., in refineries and compression stations), and hybrid alternatives to the internal combustion engine.

In other embodiments, the heat source $Q_{in}$ may derive thermal energy from renewable sources of thermal energy such as, but not limited to, solar thermal and geothermal sources. While the heat source $Q_{in}$ may be a fluid stream of the high temperature source itself, in other embodiments the heat source $Q_{in}$ may be a thermal fluid in contact with the high temperature source. The thermal fluid may deliver the thermal energy to the heat exchanger 104 to transfer the energy to the working fluid in the working fluid circuit 102. In many examples, the heat exchanger 104 is a waste heat exchanger, such that a waste heat stream or source flows through the heat exchanger 104 and provides thermal energy to the working fluid within the working fluid circuit 102.

In addition to the heat exchanger 104, the heat engine systems 90 and 100 generally have a power turbine 106 and a pump 110. In one embodiment, the heat engine system 90 further contains the single-core condensing heat exchanger 118 that includes the recuperator 114 and a fluid-cooled condenser 116, as depicted in FIG. 1. In another embodiment, the heat engine system 100 further contains the recuperator 114, but instead of the fluid-cooled condenser 116 (as in heat engine system 90), the heat engine system 100 has the air-cooled condenser 136, as depicted in FIG. 2. In the high pressure side 101, pressurized working fluid from the pump 110 may be provided to the recuperator 114 where the pressurized working fluid may be pre-heated by low pressure working fluid from the power turbine 106. Thereafter, the pre-heated working fluid may be provided to the heat exchanger 104 where the working fluid may further be heated by the heat source $Q_{in}$.

For both of the heat engine systems 90 and 100, the power turbine 106 receives and expands the heated working fluid that is discharged from the heat exchanger 104. The power turbine 106 may be any type of expansion device, such as an expander, a turbo, or a turbine and is rotatably coupled to a motor-generator 108 (e.g., a motor-power alternator/generator) and the pump 110 by a shaft 112. The power turbine 106 expands the working fluid to drive the motor-generator 108 and the pump 110. The recuperator 114 may be utilized to transfer thermal energy from the low-pressure, high temperature working fluid exiting the power turbine 106 to the high-pressure, low temperature working fluid from the pump 110.

FIG. 1 depicts the heat engine system 90 with a low pressure side of the working fluid circuit 102 such that the expanded working fluid from the power turbine 106 is discharged into the recuperator 114 of the single-core condensing heat exchanger 118. After passing through the recuperator 114, the working fluid flows through the fluid-cooled condenser 116 of the single-core condensing heat exchanger 118. In the fluid-cooled condenser 116, a cooling medium circuit 120 may be utilized to further transfer heat from the working fluid and condenses the working fluid into a liquid. The cooling medium circuit 120 may include water, glycol, a water glycol mixture, a solvent (e.g., organic solvent), a supercritical fluid, a subcritical fluid, air, carbon dioxide, nitrogen, or any other suitable cooling medium. The pump 110 receives condensed working fluid from the fluid-cooled condenser 116 and the cycle starts over.

FIG. 2 depicts a conduit 134 fluidly coupled between the recuperator 114 and the air-cooled condenser 136 in the heat engine system 100, as described in one or more embodiments disclosed herein. In some examples, the air-cooled condenser 136 contains one or more fans or blowers, depicted as a fan 138, and a plurality of cooling fins 139 that are in thermal contact or communication with the conduit 134. The fan 138 may be utilized to blow air or another gas through and in contact with the plurality of cooling fins 139. The thermal energy may be transferred from the working fluid through the air-cooled condenser 136, and dissipated or otherwise transferred into the air or other gas flowing over the cooling fins 139. Therefore, the thermal energy may be removed from the working fluid within the working fluid circuit 102. The cooling fins 139 or other heat sinks generally have properties that include a relatively high surface area and high thermal conductivity so that thermal energy can absorb and desorb at a relatively high rate. In some examples, a finned-tube module used as the cooling fins 139 may be exposed to air blown from the fans 138, such as forced draft fans. The air-cooled condenser 136 may be utilized to condense the working fluid (e.g., $CO_2$) by removing thermal energy from the working fluid flowing through the conduit 134 downstream of the recuperator 114. Additionally, a conduit 132 may be fluidly coupled between the air-cooled condenser 136 and the pump 110 within the heat engine system 100. Therefore, the condensed working fluid may flow from the air-cooled condenser 136 to the pump 110 through the conduit 132.

During system start-up of the heat engine system 90 or 100, the motor-generator 108 may be supplied with electricity so as to act as a motor to operate the pump 110 to circulate the working fluid through the working fluid circuit 102. As the working fluid is circulated, the amount of energy contained within the working fluid increases to the point where the energy provided by the power turbine 106 is sufficient to power the pump 110 via the shaft 112. Once the energy is sufficient to power the pump 110, the motor-generator 108 may also be driven via the shaft 112 and utilized as a generator producing net electric power.

In another embodiment, the heat engine system 90 (FIG. 1) and the heat engine system 100 (FIG. 2) may contain a chamber or housing, such as a housing 113 at least partially, substantially, or completely encompassing the pump 110, the motor-generator 108, the power turbine 106, and/or the shaft 112. The heat engine system 100 may be configured to provide or otherwise deliver a gas or fluid, such as dry seal gas, bearing gas, a portion of the working fluid, air, other gas, or combinations thereof into the housing 113, for purposes of cooling one or more parts of the power turbine 106. In many examples, a portion of the working fluid (e.g., sc-$CO_2$) may be utilized in the housing 113. The housing 113 may also be utilized to prevent or capture any gas leakage, such as the working fluid, from the pump 110, the motor-generator 108, the power turbine 106, and/or a seal assembly (not shown) disposed along the shaft 112.

In another embodiment, as depicted in FIG. 1, the heat engine system 90 contains a seal gas system 204 that may be utilized to provide pressurized seal gas or fluid to the motor-generator 108, as well as to the other components, such as the power turbine 106 and/or the shaft 112. The seal gas system 204 may be a pressurized gas/fluid system and may be external of the working fluid circuit 102 and/or the heat engine system 90. The seal gas or fluid may be transferred to the motor-generator 108 or into the housing 113 through a seal gas inlet 206 and the recovered seal gas may be transferred out of the motor-generator 108 or the housing 113 by a seal gas outlet 208. The seal gas inlet 206 and the seal gas outlet 208 may be disposed on the housing 113 and/or casing or other portions of the pump 110, the motor-generator 108, the power turbine 106, and/or the shaft 112. The seal gas system 204 may be fluidly coupled to the seal gas inlet 206 by a conduit 205 and may be fluidly coupled to the seal gas outlet 208 by a conduit 207. Maintaining a sufficient seal gas pressure within the motor-generator 108 can help prevent the migration of the working fluid from the pump 110 or the power turbine 106 into the motor-generator 108. The seal gas may contain carbon dioxide, nitrogen, argon, air, or combinations thereof and the seal gas may be in a gaseous state, a liquid state, a supercritical state, or a subcritical state. In some exemplary embodiments, the seal gas may contain a portion of the working fluid contained within the seal gas system 204. In one example, the seal gas contains carbon dioxide removed from the working fluid circuit 102.

In another embodiment, as depicted in FIG. 2, the heat engine system 100 has a leak recapture system 150 that may be utilized to recycle leaked and captured gas. The leak recapture system 150 may be configured to flow or otherwise transfer the leaked and captured gas or fluid from the housing 113 back into the working fluid circuit 102. A conduit 154 may be fluidly coupled to and between the housing 113 and a compressor 152, as well as fluidly coupled to and between the compressor 152 and a point on a conduit 103 upstream of the recuperator 114 and downstream of the outlet of the power turbine 106. The compressor 152 may be utilized to remove the leaked and captured gas or fluid from the housing 113, to pressurize and to flow the leaked and captured gas, as a gas, a liquid, a subcritical fluid, and/or a supercritical fluid into the working fluid circuit 102.

The compressor 152 may be utilized to remove the leaked and captured gas or fluid from a motor-generator case (not shown) that may be within or part of the housing 113. The motor-generator case may be a case, a housing, or the like that completely or partially encompasses the motor-generator 108. In some examples, the pressure of the motor-generator case may be actively maintained within a range from about 0.5 MPa to about 10 MPa, more narrowly within a range from about 0.8 MPa to about 5 MPa, and more narrowly within a range from about 1 MPa to about 3 MPa. The pressurized state of the working fluid (e.g., sc-$CO_2$ or sub-$CO_2$) reduces density of the working fluid, thereby minimizing windage or fluidic frictional drag at the motor-generator rotor.

In other embodiments, a process control system 182 containing a computer system 184 is generally operatively connected to the heat engine systems 90 and 100. The process control system 182 may be configured to control and operate each of the components of the heat engine systems 90 and 100 including the power turbine 106, the motor-generator 108, the pump 110, and other components, as well as any of the valves and sensors throughout the working fluid circuit 102. The process control system 182 may be configured to monitor and adjust temperatures and pressures throughout the working fluid circuit 102 by controlling and adjusting each of the components of the heat engine systems 90 and 100. In one embodiment, the process control system 182 is enabled to move, adjust, manipulate, or otherwise control at least one valve, or multiple valves, for adjusting or controlling the flow of the working fluid throughout the working fluid circuit 102. By controlling the flow of the working fluid, the process control system 182 is also operable to regulate the temperatures and pressures throughout the working fluid circuit 102.

A power turbine shut-off valve 122 and a bypass valve 124, depicted in FIGS. 1 and 2, may be independently utilized to reduce or cease the flow of the working fluid during a system start-up process. The power turbine shut-off valve 122 is operatively coupled to a conduit 218 extending from the outlet of the heat exchanger 104, along the high pressure side of the working fluid circuit 102, and to the inlet of the power turbine 106. The power turbine shut-off valve 122 is configured to control the flow of the working fluid through the conduit 218. The bypass valve 124 is operatively coupled to a conduit, a bypass line 126, extending from a point downstream of the outlet of the pump 110 and upstream of the inlet of the recuperator 114, along the high pressure side of the working fluid circuit 102, and to the conduit 218. The bypass valve 124 is configured to control the flow of the working fluid through the bypass line 126. The power turbine shut-off valve 122 and the bypass valve 124 may be partially or completely closed/opened or modulated between varying opened/closed positions to control the flow of the working fluid entering the power turbine 106. The control of the working fluid circulation via the power turbine shut-off valve 122 and the bypass valve 124 provides the working fluid to be heated to the desired temperature and/or pressurized to the desired pressure for driving the power turbine 106. The power turbine shut-off valve 122 and the bypass valve 124 may independently be manually controlled or may be automatically controlled via the process control system 182.

In certain embodiments, during the operation of the heat engine systems 90 and 100 or other heat engine systems described herein, the pump 110 may provide the working fluid (e.g., $CO_2$) contained in the working fluid circuit 102 at a pressure within a range from about 2 MPa to about 23 MPa, more narrowly within a range from about 17 MPa to about 23 MPa and at a flowrate within a range from about 1 kg/s (kilogram per second) to about 15 kg/s, more narrowly within a range from about 2 kg/s to about 12 kg/s, and more narrowly within a range from about 4 kg/s to about 7 kg/s. The temperature of the working fluid, such as carbon dioxide, entering the recuperator 114 may be within a range from about −10° C. to about 70° C., more narrowly within a range from about 30° C. to about 50° C., and the temperature of the working fluid exiting the recuperator 114 may be within a range from about 50° C. to about 180° C., more narrowly within a range from about 100° C. to about 130° C.

Since the heat source $Q_{in}$ may derive thermal energy from a variety of high temperature sources, the temperature of and the available energy from the heat source $Q_{in}$ will also vary. Generally, the heat source $Q_{in}$ may be at a temperature within a range from about 100° C. to about 1,000° C., or greater than 1,000° C., and in some examples, within a range from about 100° C. to about 800° C., more narrowly within a range from about 150° C. to about 600° C., and more narrowly within a range from about 200° C. to about 550° C. The heat source may provide available energy within a range from about 1,500 kWth (kilowatt thermal) to about 2,600 kWth, so as to increase the temperature of the working fluid passing through the heat exchanger 104 and provided to the power turbine 106. The temperature of the working fluid is increased as the working fluid passing through the heat exchanger 104 and thermal energy is transferred from the heat source $Q_{in}$ to the working fluid within the working fluid circuit 102. In some exemplary embodiments, the working fluid passing through the heat exchanger 104 may have an increased temperature within a range from about 170° C. to about 550° C., more narrowly within a range from about 190° C. to about 350° C. Subsequently, once a portion of the thermal energy is removed from the heat $Q_{in}$ source stream, a return temperature of the heat source $Q_{in}$ stream may be within a range from about 50° C. to about 250° C., more narrowly within a range from about 70° C. to about 190° C., and more narrowly within a range from about 80° C. to about 170° C.

The power turbine 106 may expand the working fluid containing carbon dioxide and may operate the motor-generator to produce or otherwise generate electricity at a power level of generally less than 1 MW (or sub 1 MW), such as within a range from about 10 kW to about 950 kW, more narrowly within a range from about 50 kW to about 800 kW, more narrowly within a range from about 100 kW to about 500 kW, and more narrowly within a range from about 150 kW to about 375 kW, for example, about 300 kW. Upon exiting the power turbine 106, the working fluid may be flowed to the single-core condensing heat exchanger 118 (FIG. 1) or the air-cooled condenser 136 (FIG. 2) and has a temperature within a range from about 140° C. to about 350° C., more narrowly within a range from about 180° C. to about 260° C., and more narrowly within a range from about 200° C. to about 230° C. Once the working fluid containing carbon dioxide passes through the single-core condensing heat exchanger 118 or the air-cooled condenser 136, the working fluid may be provided to the pump 110 at a temperature within a range from about −20° C. to about 40° C., more narrowly within a range from about 10° C. to about 20° C. FIG. 2 depicts the heat engine system 100 configured with the air-cooled condenser 136. The working fluid containing carbon dioxide that exits the recuperator 114 and is provided or otherwise delivered to the air-cooled condenser 136 may have a temperature within a range from about 5° C. to about 75° C., more narrowly within a range from about 25° C. to about 75° C., and more narrowly within a range from about 50° C. to about 70° C.

Figure 3:
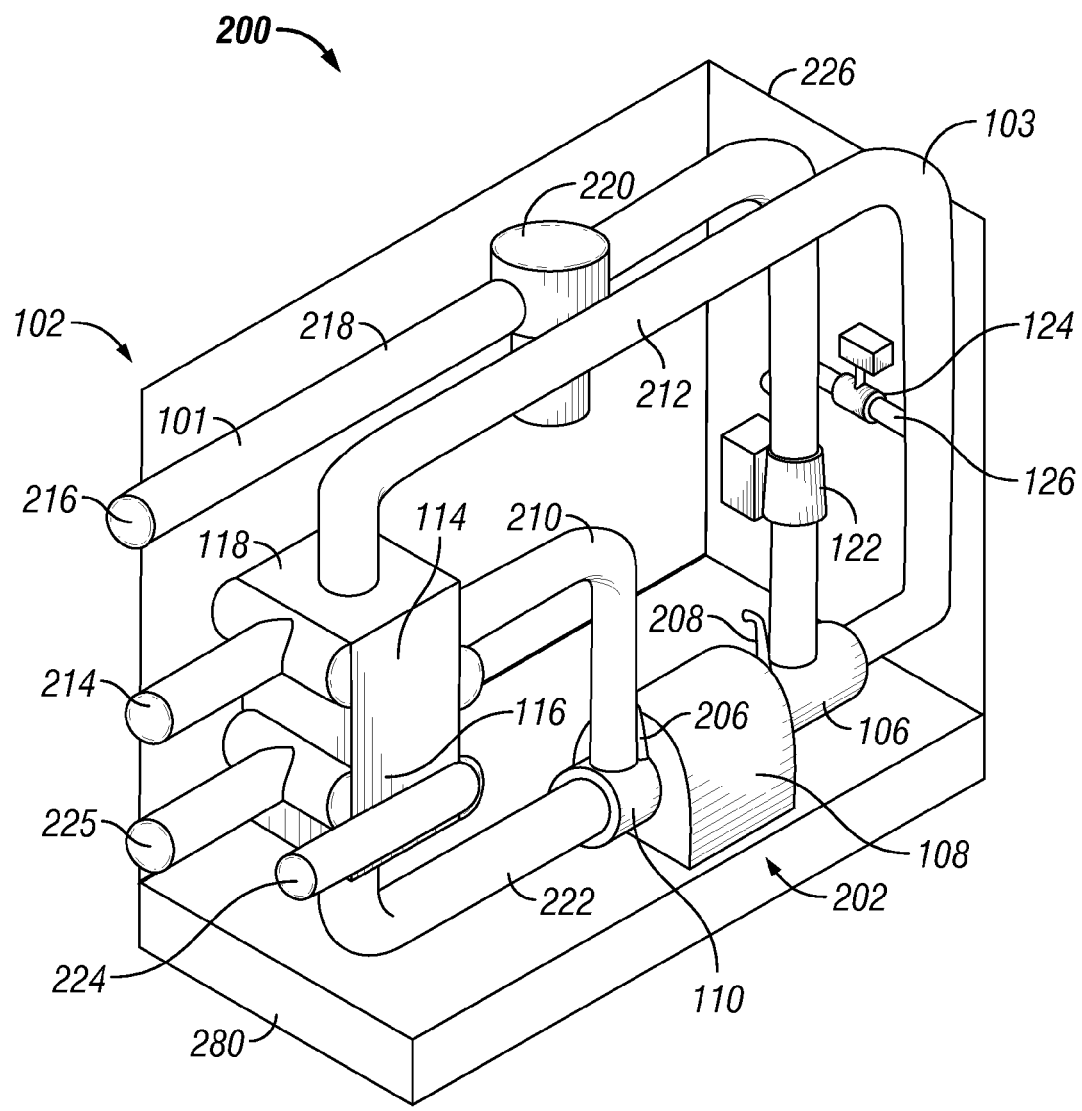
FIG. 3 illustrates another exemplary heat engine system, according to one or more embodiments disclosed herein.

FIG. 3 illustrates an exemplary embodiment of a heat engine system 200, which may be similar in some respects to the heat engine system 90 or 100 and therefore, may be best understood with reference to FIGS. 1 and 2, where like numerals correspond to like elements that will not be described again. The heat engine system 200 has a power unit 202 containing the power turbine 106, the motor-generator 108, and the pump 110. Each of the power turbine 106, the motor-generator 108, and the pump 110 may be coupled to a central shaft (not shown) and integrated into a single or consolidated unit. In some configurations, the central shaft may be similar or the same as the shaft 112. Also, the power turbine 106 and the pump 110, as well as other components, such as the heat exchanger 104, the recuperator 114, and the single-core condensing heat exchanger 118 may be fluidly coupled to the working fluid circuit 102.

In certain embodiments, the power unit 202 may include a seal gas system (not shown) for isolating the motor-generator 108 from the power turbine 106 and the pump 110. The seal gas system, which may be the same or similar to the seal gas system 204, may be a pressurized system, external of the heat engine system 200, which provides pressurized seal gas or fluid to the motor-generator 108 through the seal gas inlet 206 and recovers seal gas or fluid from the seal gas outlet 208. In an alternative embodiment, the seal gas inlet 206 and the seal gas outlet 208 may be reduced to a single port located at the center of the motor-generator case, such as a case, a housing, or an enclosure 226. This single port may be part of a leak recapture system, similar to the leak recapture system 150 depicted in FIG. 2 and discussed below.

Pressurized working fluid from the pump 110 may be provided through the conduit 210 to the recuperator 114, which is a portion of the single-core condensing heat exchanger 118. In the recuperator 114, the pressurized working fluid is heated by low-pressure working fluid supplied through the conduit 212 from the power turbine 106. The pre-heated working fluid is then provided to a waste heat exchanger (not shown) through the working fluid supply 214. The working fluid is heated by the waste heat exchanger (not shown) and returned to the heat engine system 200 via the working fluid return 216.

The heated, high-pressure working fluid is passed through the conduit 218, which may include a filter 220 and the power turbine shut-off valve 122, before entering the power turbine 106. The expanded working fluid is transferred from the power turbine 106 to the single-core condensing heat exchanger 118 via the conduit 212. The bypass valve 124 provides selective fluid communication between the conduit 218 and the conduit 212 via the bypass line 126.

The working fluid flowing or passing through from conduit 212 may be discharged into the single-core condensing heat exchanger 118. The recuperator 114, as a portion of the single-core condensing heat exchanger 118, is operable to transfer thermal energy from the low-pressure, high temperature working fluid exiting the power turbine 106 to the high-pressure, low temperature working fluid from the pump 110. In one embodiment, such as in a water-cooled configuration or a fluid-cooled configuration, after the working fluid flows through the recuperator 114, the working fluid flows through the fluid-cooled condenser 116 that is in fluid communication with the cooling medium circuit 120 and utilized to further transfer heat from the working fluid, as depicted in the heat engine system 90 (FIG. 1) and the heat engine system 200 (FIG. 3). The cooling medium circuit 120 may include a cooling water supply 224 and a cooling water return 225 through which a cooling-fluid, water, or other fluid may be circulated therethrough. In another embodiment, such as in an air-cooled configuration, after the working fluid flows through the recuperator 114, the working fluid flows through a conduit 134 to the air-cooled condenser 136, as depicted in the heat engine system 100 (FIG. 2). The air-cooled condenser 136 is configured to further transfer heat from the working fluid and into the air—outside of the heat engine system 100. The pump 110 receives condensed working fluid via a conduit 222 from the fluid-cooled condenser 116 or the air-cooled condenser 136 and the cycle starts over.

The heat engine system 200 may be contained within a case or an enclosure 226 that also provides for easy portability of the system, as depicted in FIG. 3. In certain exemplary embodiments, the enclosure 226 may have a footprint with a dimension of about 6 feet by about 10 feet and a height of about 8 feet, thus allowing the heat engine system 200 to be positioned in close proximity to a waste heat source or other heat sources, such as the heat source $Q_{in}$. In other embodiments, any of the waste heat systems disclosed herein may be disposed on a skid or other supporting device. The waste heat system 100 may be disposed on a supporting device or a skid 180, as depicted in FIG. 2. Similarly, the waste heat system 200 may be disposed on a supporting device or a skid 280, as depicted in FIG. 3. In one example, the air-cooled condenser 136 along with the plurality of cooling fins 139 and/or the fan may be located off of the skid 180.

In some embodiments, the motor-generator 108 may be a generator, an alternator (e.g., permanent magnet alternator), or other device for generating electrical energy, such as transforming mechanical energy from the shaft 112 and the power turbine 106 to electrical energy. FIG. 2 depicts a power outlet 170 electrically coupled with the motor-generator 108, a power electronics system 172, and an electrical grid 174 via a line 176. The power outlet 170 may be configured to transfer the generated electrical energy from the motor-generator 108 to the power electronics system 172 and to the electrical grid 174 via the line 176. Also, the power outlet 170 may be configured to receive electricity from the electrical grid 174 through the power electronics system 172 and transfer the electricity to the motor-generator 108—such as to run the motor-generator 108 to drive the pump 110 during some operational steps.

The line 176 may be electrical wires or cables and utilized to transfer electricity to and from the motor-generator 108, the power outlet 170, the power electronics system 172, and the electrical grid 174. The power electronics system 172 may be configured to convert the electrical power into desirable forms of electricity by modifying electrical properties, such as voltage, current, or frequency. The power electronics system 172 may include converters or rectifiers, inverters, transformers, regulators, controllers, switches, resisters, storage devices, and other power electronic components and devices. The electrical grid 174 may be or include an electrical power grid, an electrical bus (e.g., plant bus), other electric circuits, or combinations thereof. The electrical grid 174 generally contains at least one alternating current bus, alternating current grid, alternating current circuit, or combinations thereof.

In some exemplary embodiments, when the motor-generator 108 is driven by the power turbine 106, the motor-generator 108 may be utilized as an electrical generator to produce and transfer electricity to the electrical grid 174 via the line 176 through the power outlet 170 and the power electronics system 172. In other exemplary embodiments, when the motor-generator 108 is powered by electricity to drive the pump 110, the motor-generator 108 may be utilized as an electrical motor to receive electricity from the electrical grid 174 via the line 176 through the power outlet 170 and the power electronics system 172.

In some embodiments, the overall efficiency of the heat engine systems and the amount of power ultimately generated can be influenced by the inlet or suction pressure at the pump 110 when the working fluid contains supercritical carbon dioxide. In order to minimize or otherwise regulate the suction pressure of the pump 110, the heat engine system 100 may incorporate the use of a mass management system (MMS) 140, as depicted in FIG. 2. The mass management system 140 controls the inlet pressure of the pump 110 by regulating the amount of the working fluid entering and/or exiting the heat engine system 100 at strategic locations in the working fluid circuit 102, such as at tie-in points, inlets/outlets, valves, or conduits throughout the heat engine system 100. Consequently, the heat engine system 100 becomes more efficient by increasing the pressure ratio for the pump 110 to a maximum possible extent.

The mass management system 140 contains at least one vessel or tank, such as a storage vessel (e.g., working fluid storage vessel), a fill vessel, and/or a mass control tank (e.g., mass control tank 142), fluidly coupled to the low pressure side of the working fluid circuit 102 by one or more conduits and valves, such as one or more of the conduits 144a, 144b, and 144c and the valves 146a, 146b, and 146c. The valves 146a, 146b, and 146c are moveable—as being partially opened, fully opened, and/or closed—to either remove working fluid from the working fluid circuit 102 or add working fluid to the working fluid circuit 102 via the conduits 144a, 144b, and 144c.

In one exemplary configuration, the conduit 144a may be fluidly coupled to the high pressure side of the working fluid circuit 102, such that one end of the conduit 144a is fluidly coupled to the working fluid circuit 102 at a point disposed downstream of the pump 110 and upstream of the recuperator 114, and the other end of the conduit 144a is fluidly coupled to an inlet on the mass control tank 142. The valve 146a may be operably connected to and fluidly coupled to the conduit 144a and configured to control the flow of the working fluid from the high pressure side of the working fluid circuit 102, through the conduit 144a, and to the mass control tank 142. The conduit 144b may be fluidly coupled to the high pressure side of the working fluid circuit 102, such that one end of the conduit 144b is fluidly coupled to the working fluid circuit 102 at a point disposed downstream of the heat exchanger 104 and upstream of the power turbine 106, and the other end of the conduit 144b is fluidly coupled to an inlet on the mass control tank 142. The valve 146b may be operably connected to and fluidly coupled to the conduit 144b and configured to control the flow of the working fluid from the high pressure side of the working fluid circuit 102, through the conduit 144b, and to the mass control tank 142. The conduit 144c may be fluidly coupled to the low pressure side of the working fluid circuit 102, such that one end of the conduit 144c is fluidly coupled to an outlet on the mass control tank 142 and the other end of the conduit 144c is fluidly coupled to the working fluid circuit 102 at a point disposed downstream of a cooler or condenser (e.g., the single-core condensing heat exchanger 118 in FIG. 1 and/or the air-cooled condenser 136 in FIG. 2) the heat exchanger 104 and upstream of the pump 110. The valve 146c may be operably connected to and fluidly coupled to the conduit 144c and configured to control the flow of the working fluid from the mass control tank 142, through the conduit 144c, and to low pressure side of the working fluid circuit 102.

Besides the valves 146a, 146b, and 146c, the mass management system 140 may also include a plurality of connection points. Each of the valves 146a, 146b, and 146c and/or the connection points may be in fluid communication with the mass control tank 142. The valves 146a, 146b, and 146c may be considered as termination points where the mass management system 140 is operatively connected to the heat engine system 100. The connection points and valves 146a, 146b, and 146c may be configured to provide the mass management system 140 with an outlet for flaring excess working fluid or pressure, or to provide the mass management system 140 with additional/supplemental working fluid from an external source, such as a fluid fill system.

In some embodiments, the mass control tank 142 may be configured as a localized storage tank for additional/supplemental working fluid that may be added to the heat engine system 100 when needed in order to regulate the pressure or temperature of the working fluid within the working fluid circuit 102 or otherwise supplement escaped working fluid. By controlling or otherwise operating the valves 146a, 146b, and 146c, the mass management system 140 adds and/or removes the working fluid to/from the heat engine system 100 with or without the need of a pump, thereby reducing system cost, complexity, and maintenance. Exemplary embodiments of the mass management system 140, and a range of variations thereof, are found in U.S. application Ser. No. 13/278,705, filed Oct. 21, 2011, and published as U.S. Pub. No. 2012-0047892, which are incorporated herein by reference in their entirety to the extent consistent with the present application.

In one or more embodiments disclosed herein, as depicted in FIGS. 1-3, the heat engine systems 90, 100, and 200 may be utilized to produce mechanical energy and/or electrical energy from a wide range of thermal sources, such as a waste heat source. The working fluid circuit 102 of the heat engine systems 90, 100, and 200 contains the working fluid and has the high pressure side and the low pressure side. At least a portion of the working fluid circuit 102 contains the working fluid in a supercritical state, such as supercritical carbon dioxide. The heat engine systems 90, 100, and 200 further contain the power turbine 106 disposed between the high pressure side and the low pressure side of the working fluid circuit 102, fluidly coupled to and in thermal communication with the working fluid, and configured to convert thermal energy to mechanical energy by a pressure drop in the working fluid passing or otherwise flowing between the high and the low pressure sides of the working fluid circuit 102.

The heat engine systems 90, 100, and 200 also contain the motor-generator 108 coupled to the power turbine 106 and configured to convert the mechanical energy into electrical energy and the pump 110 coupled to the power turbine 106. The pump 110 may be fluidly coupled to the low pressure side of the working fluid circuit 102 by the pump inlet of the pump 110 which is configured to receive the working fluid from the low pressure side of the working fluid circuit 102. Also, the pump 110 may be fluidly coupled to the high pressure side of the working fluid circuit 102 by the pump outlet of the pump 110 which is configured to release the working fluid into the high pressure side of the working fluid circuit 102. The pump 110 may also be configured to circulate and/or pressurize the working fluid within the working fluid circuit 102; therefore, the pump 110 may be utilized to increase or decrease the flowrate of the working fluid and the pressure at which the working fluid is maintained within the working fluid circuit 102.

The heat engine systems 90, 100, and 200 further contain the heat exchanger 104 fluidly coupled to and in thermal communication with the high pressure side of the working fluid circuit 102, configured to be fluidly coupled to and in thermal communication with a heat source stream, such as the heat source $Q_{in}$, and configured to transfer thermal energy from the heat source stream to the working fluid. The heat engine systems 90, 100, and 200 also contain the recuperator 114 fluidly coupled to a condenser (e.g., the fluid-cooled condenser 116 (FIGS. 1 and 3) or the air-cooled condenser 136 (FIG. 2)) in series on the low pressure side of the working fluid circuit 102. The recuperator 114 may be fluidly coupled to the working fluid circuit 102 downstream of the pump 110 and upstream of the heat exchanger 104 on the high pressure side of the working fluid circuit 102, fluidly coupled to the working fluid circuit 102 downstream of the power turbine 106 and upstream of the condenser 116 or 136 on the low pressure side of the working fluid circuit 102, and configured to transfer thermal energy from the working fluid within the low pressure side to the working fluid within the high pressure side of the working fluid circuit 102. The condenser 116 or 136 may be fluidly coupled to the working fluid circuit 102 downstream of the recuperator 114 and upstream of the pump 110 on the low pressure side of the working fluid circuit 102 and configured to remove thermal energy from the working fluid within the low pressure side of the working fluid circuit 102.

In one embodiment, as depicted in FIG. 1, the fluid-cooled condenser 116 is coupled to and in thermal communication with the cooling medium circuit 120 and the working fluid circuit 102. The cooling medium circuit 120 generally may contain circulating chilled water or another liquid medium. In another embodiment, as depicted in FIG. 2, the air-cooled condenser 136 generally contains cooling fins 139 or a heat sink and the cooling fins 139 or the heat sink may be positioned and/or configured to receive a gaseous flow from one or more fans 138. In many examples disclosed herein, the working fluid within the working fluid circuit 102 disposed in the heat engine systems 90, 100, and 200 contain carbon dioxide (e.g., sc-$CO_2$).

For the heat engine systems 90, 100, and 200, the motor-generator 108 may be coupled to or with the power turbine 106 by the shaft 112 and the pump 110 may also be coupled to or with the power turbine 106 by the shaft 112 or an independent shaft (not shown). The motor-generator 108 is generally disposed between the power turbine 106 and the pump 110 and the motor-generator 108 may be coupled to or with the power turbine 106 and the pump 110 by independent shafts or by one common shaft, such as the shaft 112. In some examples, the pump 110, the power turbine 106, and the motor-generator 108 are rotatably coupled by the shaft 112 within the heat engine systems 90, 100, and 200.

In some embodiments, as illustrated in FIG. 2, the heat engine system 100 further contains a power outlet or the power electronics system 172 electrically coupled to the motor-generator 108 and configured to transfer the electrical energy from the motor-generator 108 to the electrical grid 174. In other embodiments, the mass management system 140 may be fluidly connected to the working fluid circuit 102 via a mass control tank 142. The mass control tank 142 is configured to receive or remove the working fluid from the working fluid circuit 102, store the working fluid, and distribute the working fluid back into the working fluid circuit 102. In one exemplary configuration, the mass control tank 142 may be fluidly coupled to the high pressure side of the working fluid circuit 102 and configured to receive the working fluid from the high pressure side. Also, the mass control tank 142 may be fluidly coupled to the low pressure side of the working fluid circuit 102 and configured to distribute the working fluid to the low pressure side.

The heat engine systems 90 and 100 may contain the housing 113 to at least partially encompass the pump 110, the motor-generator 108, and the power turbine 106, as depicted in FIGS. 1 and 2. Similarly, FIG. 3 depicts the heat engine system 200 containing the motor-generator 108, the power turbine 106, and the single-core condensing heat exchanger 118 disposed on a support structure, such as the skid 280 and encompassed partially, substantially, or completely by a housing or an enclosure 226.

In another embodiment disclosed herein, a heat engine system 90 may be utilized to generate electricity and contains the single-core condensing heat exchanger 118. Generally, the single-core condensing heat exchanger 118 has a working fluid inlet and a working fluid outlet that provides a working fluid flow channel. The inlet and the outlet of the recuperator 114 provide the recuperator 114 a flow channel through the single-core condensing heat exchanger 118 and provide thermal communication with the working fluid flow channel. Also, a condenser inlet and a condenser outlet provide a condenser flow channel through the single-core condensing heat exchanger 118 and provide thermal communication with the working fluid flow channel.

The heat engine systems 90, 100, and 200 further contain the pump 110 which has an inlet in fluid communication with the working fluid outlet and an outlet in fluid communication with the inlet of the recuperator 114. The power turbine 106 has an inlet in fluid communication with the outlet of the recuperator 114 and an outlet in fluid communication the working fluid inlet. The motor-generator 108 may be rotatably coupled to the pump 110 and the power turbine 106.

In another embodiment disclosed herein, as depicted in FIGS. 1 and 3, the heat engine systems 90 and 200 may be utilized to generate electricity and contain the pump 110 rotatably coupled to the motor-generator 108, the power turbine 106 rotatably coupled to the motor-generator 108, and the single-core condensing heat exchanger 118 having a working fluid inlet in fluid communication with an outlet of the power turbine 106 and a working fluid outlet in fluid communication with an inlet of the pump 110.

The heat engine systems 90 and 200 further contain the inlet of the recuperator 114 disposed on the single-core condensing heat exchanger 118 and in fluid communication with an outlet of the pump 110, the outlet of the recuperator 114 disposed on the single-core condensing heat exchanger and in fluid communication with an inlet of the power turbine 106, and a condenser inlet and a condenser outlet disposed on the single-core condensing heat exchanger 118. The heat exchanger 104 (e.g., a waste heat exchanger) may be disposed in fluid communication with the outlet of the recuperator 114 and the inlet of the power turbine 106. The heat engine systems 90 and 200 also contain a condenser loop, such as the cooling medium circuit 120, in fluid communication with the condenser inlet and the condenser outlet. The heat engine systems 90 and 200 have the bypass valve 124 providing selective fluid communication between the inlet and the outlet of the power turbine 106. In some examples, the single-core condensing heat exchanger 118 contains a plurality of parallel plates or fins.

In another embodiment disclosed herein, the heat engine systems 90 and 200 may be utilized to perform a method for generating electricity that includes operating the motor-generator 108 to drive the pump 110 that circulates or otherwise transfers the working fluid from a low pressure side of the working fluid circuit 102 to a high pressure side of the working fluid circuit 102, adding heat to the working fluid in the high pressure side of the working fluid circuit 102 by passing the working fluid in thermal communication with the working fluid in the low pressure side of the working fluid circuit 102 in the single-core condensing heat exchanger 118, and adding heat to the working fluid in the high pressure side of the working fluid circuit 102 by passing the working fluid in thermal communication with a waste heat source, such as the heat source $Q_{in}$. The method further includes introducing the working fluid into the power turbine 106 that converts high pressure working fluid into low pressure working fluid and generates rotational energy, such that the power turbine 106 is rotationally coupled to the motor-generator 108. The method also includes exhausting the working fluid from the power turbine 106 into the single-core condensing heat exchanger 118 where the working fluid is first cooled by passing in thermal communication with the high pressure side of the working fluid circuit 102 and then further cooled by passing in thermal communication with a condenser loop, such as the cooling medium circuit 120. The method further includes operating the bypass valve 124 to selectively control the flow of the working fluid to the power turbine 106, such as for operating the power turbine 106 and the motor-generator 108 to generate electricity.

In another embodiment disclosed herein, the heat engine system 100 may be utilized to perform a method for generating electricity that includes operating the motor-generator 108 to drive the pump 110 that circulates or otherwise transfers the working fluid from a low pressure side of the working fluid circuit 102 to a high pressure side of the working fluid circuit 102 and transferring thermal energy from the heat source $Q_{in}$ (e.g., waste heat source or heat source stream) to the high pressure side of the working fluid circuit 102 by flowing the working fluid through the heat exchanger 104 thermally coupled to the heat source $Q_{in}$. The method further includes transferring thermal energy from the low pressure side to the high pressure side of the working fluid circuit 102 by flowing the working fluid through the recuperator 114.

The method further includes introducing the working fluid into the power turbine 106 and converting a high pressure working fluid into a low pressure working fluid and generating mechanical or rotational energy. The mechanical or rotational energy formed by the power turbine 106 may be utilized to rotate or otherwise operate the motor-generator 108 for generating electrical energy and to rotate or otherwise operate the pump 110 for circulating and pressurizing the working fluid within the working fluid circuit 102.

The method also includes exhausting the working fluid from the power turbine 106 through the recuperator 114 where the working fluid is first cooled by passing in thermal communication with the high pressure side of the working fluid circuit 102 and then further cooled by passing in thermal communication with and the air-cooled condenser 136. The method further includes operating the bypass valve 124 to selectively control the flow of the working fluid to the power turbine 106, such as for operating the power turbine 106 and the motor-generator 108 to generate electricity.

Figure 4:
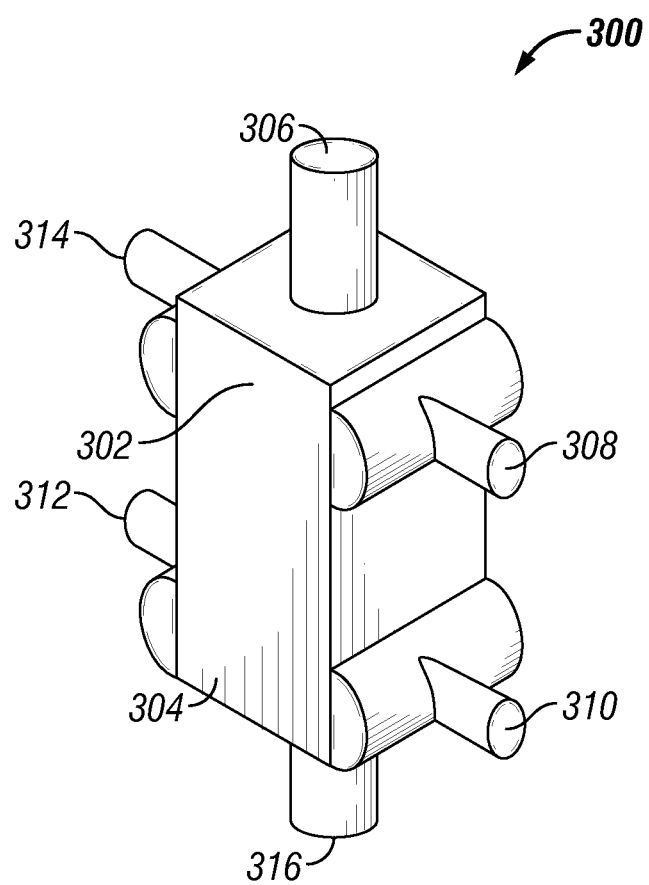
FIG. 4 illustrates a single-core condensing heat exchanger, according to one or more embodiments disclosed herein.

FIG. 4 depicts an exemplary single-core condensing heat exchanger 300 that contains a recuperator 302 and a condenser 304. The single-core condensing heat exchanger 300 may include a working fluid inlet 306 and a working fluid outlet 316 that provide a working fluid flow channel through the single-core condensing heat exchanger 300. The recuperator 302 may include a recuperator inlet 308 and a recuperator outlet 314 that provide a recuperator flow channel that passes in thermal communication with the working fluid flow channel. The condenser 304 may include a condenser inlet 310 and a condenser outlet 312 that provide a condenser flow channel that passes in thermal communication with the working fluid flow channel. The single-core condensing heat exchanger 300 may include additional recuperators and/or condensers as desired by a particular process. In some embodiments, the single-core condensing heat exchanger 300 and the single-core condensing heat exchanger 118 may have the same components or may be configured with different components. The single-core condensing heat exchanger 300 may be utilized in the heat engine systems 90 and 200 as a substitute for the single-core condensing heat exchanger 118.

Figure 5:
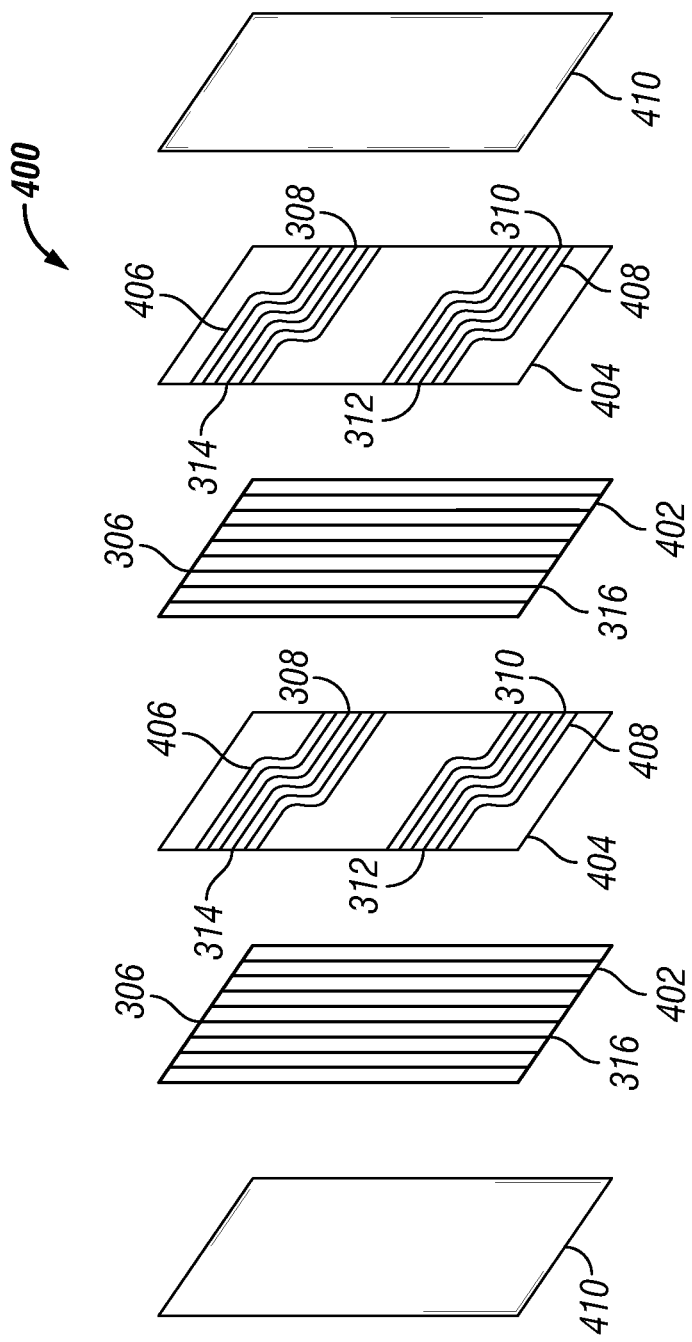
FIG. 5 illustrates an exploded view of a single-core condensing heat exchanger, according to one or more embodiments disclosed herein.

The single-core condensing heat exchanger 300 may be constructed using any of a variety of types of heat exchangers, including, but not limited to shell and tube heat exchangers, plate heat exchangers, plate fin heat exchangers, and spiral heat exchangers. FIG. 5 illustrates an exploded view of a single-core condensing heat exchanger 400 constructed from a plurality of thin metal plates containing flow passages formed on one or both sides thereof. In certain embodiments, the plates may have a thickness within a range from about 0.5 millimeters to about 5.0 millimeters, more narrowly within a range from about 1.0 millimeters to about 3.5 millimeters, and more narrowly within a range from about 1.6 millimeters to about 2.0 millimeters. The flow passages may be formed onto the plates through a variety of processes, such as machining, chemical-etching, photo-etching, or stamping, as well as by other techniques or processes.

The heat exchanger 400 may include one or more longitudinal flow plates 402 interleaved with one or more cross-flow plates 404. Each longitudinal flow plate 402 may include flow passages forming a working fluid flow passage that directs flow from a working fluid inlet 306 to a working fluid outlet 316. Each cross-flow plate 404 may include recuperator flow passages 406 that form a recuperator flow passage between a recuperator inlet 308 and a recuperator outlet 314. Each cross-flow plate 404 may also include condenser flow passages 408 that form a condenser flow passage between a condenser inlet 310 and a condenser outlet 312.

The longitudinal flow plates 402 and the cross-flow plates 404 are disposed between opposing cover plates 410 and formed into a unitary structure (as shown in FIG. 5). The plates (e.g., the cover plates 410, longitudinal flow plates 402, and the cross-flow plates 404) may be formed into a unitary structure by a brazing or welding process or in a diffusion bonding oven that compresses the plates together under conditions that cause the grain structure in adjacent plates to bond. Headers and/or nozzles are then coupled to the heat exchanger 400 at the inlets 306, 308, and 310 and the outlets 312, 314, and 316 from each flow passage or group of flow passages.

It is to be understood that the present disclosure describes several exemplary embodiments for implementing different features, structures, or functions of the disclosure. Exemplary embodiments of components, arrangements, and configurations are described herein to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the present disclosure may include embodiments in which the first and second features are formed in direct contact, and may also include embodiments in which additional features may be formed interposing the first and second features, such that the first and second features may not be in direct contact. Finally, the exemplary embodiments described herein may be combined in any combination of ways, e.g., any element from one exemplary embodiment may be used in any other exemplary embodiment without departing from the scope of the disclosure.

Additionally, certain terms are used throughout the written description and claims to refer to particular components. As one skilled in the art will appreciate, various entities may refer to the same component by different names, and as such, the naming convention for the elements described herein is not intended to limit the scope of the disclosure, unless otherwise specifically defined herein. Further, the naming convention used herein is not intended to distinguish between components that differ in name but not function. Further, in the written description and in the claims, the terms "including", "containing", and "comprising" are used in an open-ended fashion, and thus should be interpreted to mean "including, but not limited to". All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B", unless otherwise expressly specified herein.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A heat engine system for generating electricity, comprising:
    a working fluid circuit comprising a working fluid and having a high pressure side and a low pressure side, wherein the working fluid comprises carbon dioxide and at least a portion of the working fluid circuit contains the working fluid in a supercritical state;
    a power turbine disposed between the high pressure side and the low pressure side of the working fluid circuit, fluidly coupled to and in thermal communication with the working fluid, and configured to convert thermal energy to mechanical energy by a pressure drop in the working fluid flowing between the high and the low pressure sides of the working fluid circuit;
    a motor-generator coupled to the power turbine and configured to convert the mechanical energy into electrical energy;
    a pump coupled to the power turbine, fluidly coupled to the low pressure side of the working fluid circuit by a pump inlet configured to receive the working fluid from the low pressure side of the working fluid circuit, fluidly coupled to the high pressure side of the working fluid circuit by a pump outlet configured to release the working fluid into the high pressure side of the working fluid circuit, and configured to circulate and pressurize the working fluid within the working fluid circuit;
    a heat exchanger fluidly coupled to and in thermal communication with the high pressure side of the working fluid circuit, configured to be fluidly coupled to and in thermal communication with a heat source stream, and configured to transfer thermal energy from the heat source stream to the working fluid; and
    a recuperator fluidly coupled to a condenser in series on the low pressure side of the working fluid circuit, wherein:
        the recuperator is fluidly coupled to the working fluid circuit downstream of the pump and upstream of the heat exchanger on the high pressure side of the working fluid circuit, fluidly coupled to the working fluid circuit downstream of the power turbine and upstream of the condenser on the low pressure side of the working fluid circuit, and configured to transfer thermal energy from the working fluid within the low pressure side to the working fluid within the high pressure side of the working fluid circuit; and
        the condenser is fluidly coupled to the working fluid circuit downstream of the recuperator and upstream of the pump on the low pressure side of the working fluid circuit and configured to remove thermal energy from the working fluid within the low pressure side of the working fluid circuit.

2. The heat engine system of claim 1, wherein the condenser is an air-cooled condenser.

3. The heat engine system of claim 2, wherein the air-cooled condenser contains cooling fins or a heat sink configured to receive a gaseous flow from one or more fans.

4. The heat engine system of claim 1, wherein the condenser is a fluid-cooled condenser.

5. The heat engine system of claim 1, further comprising a shaft coupled to the power turbine, the motor-generator, and the pump, wherein the motor-generator is disposed between the power turbine and the pump along the shaft.

6. The heat engine system of claim 1, further comprising a power outlet or a power electronics system electrically coupled to the motor-generator and configured to transfer the electrical energy from the motor-generator to an electrical grid.

7. The heat engine system of claim 1, further comprising a process control system operatively connected to the heat engine system, wherein the process control system is configured to monitor and adjust temperatures and pressures throughout the working fluid circuit.

8. The heat engine system of claim 1, further comprising a mass management system fluidly coupled to the working fluid circuit, wherein the mass management system contains a mass control tank configured to receive, store, and distribute the working fluid.

9. The heat engine system of claim 8, wherein the mass control tank is configured to receive the working fluid from the high pressure side and configured to distribute the working fluid to the low pressure side.

10. The heat engine system of claim 1, further comprising a housing and a leak recapture system, wherein the housing at least partially encompasses the pump and the power turbine, and the leak recapture system is configured to transfer captured gas or fluid from the housing, through a compressor, and into the working fluid circuit at a point upstream of the recuperator and downstream of an outlet of the power turbine.

11. A heat engine system, comprising:
    a single-core condensing heat exchanger having a working fluid inlet and a working fluid outlet providing a working fluid flow channel;
    a recuperator inlet and a recuperator outlet providing a recuperator flow channel through the single-core condensing heat exchanger and in thermal communication with the working fluid flow channel;
    a condenser inlet and a condenser outlet providing a condenser flow channel through the single-core condensing heat exchanger and in thermal communication with the working fluid flow channel;
    a pump having an inlet in fluid communication with the working fluid outlet and an outlet in fluid communication with the recuperator inlet;
    a power turbine having an inlet in fluid communication with the recuperator outlet and an outlet in fluid communication the working fluid inlet; and
    a motor-generator rotatably coupled to the pump and the power turbine.

12. The heat engine system of claim 11, further comprising a waste heat exchanger disposed in fluid communication with the recuperator outlet and the power turbine inlet.

13. The heat engine system of claim 11, further comprising a bypass valve providing selective fluid communication between the power turbine inlet and the power turbine outlet.

14. The heat engine system of claim 11, wherein the single-core condensing heat exchanger comprises a plurality of parallel plates.

15. The heat engine system of claim 11, wherein the single-core condensing heat exchanger comprises a recuperator having the recuperator inlet and the recuperator outlet.

16. The heat engine system of claim 11, wherein the single-core condensing heat exchanger comprises a condenser having the condenser inlet and the condenser outlet.

17. A method for generating electricity comprising:
   operating a motor-generator to drive a pump for transferring a working fluid from a low pressure side of a working fluid circuit to a high pressure side of the working fluid circuit;
   adding heat to the working fluid in the high pressure side of the working fluid circuit by passing the working fluid in thermal communication with the working fluid in the low pressure side of the working fluid circuit in a single-core condensing heat exchanger;
   adding heat to the working fluid in the high pressure side of the working fluid circuit by passing the working fluid in thermal communication with a heat source stream;
   introducing the working fluid into a power turbine while converting high pressure working fluid into low pressure working fluid and generating rotational energy, wherein the power turbine is rotationally coupled to the motor-generator; and
   exhausting the working fluid from the power turbine into the single-core condensing heat exchanger where the working fluid is first cooled by passing in thermal communication with the high pressure side of the working fluid circuit and then further cooled by passing in thermal communication with a condenser loop.

18. The method of claim 17, further comprising operating a bypass valve to selectively control the flow of the working fluid to the power turbine.

19. The method of claim 17, further comprising operating the motor-generator to generate the electricity.

20. The method of claim 17, wherein the heat source stream is derived from a waste heat source and a waste heat exchanger is fluidly coupled to and in thermal communication with the heat source stream.

* * * * *